United States Patent
Kritzler et al.

[11] Patent Number: 5,397,548
[45] Date of Patent: Mar. 14, 1995

[54] REGENERATIVE HEAT EXCHANGER

[75] Inventors: Gerhard Kritzler, Freudenberg; Siegfried Schlüter, Wenden-Rothemühle, both of Germany

[73] Assignee: Apparatebau Rothemühle Brandt & Kritzler Gesellschaft mit besehränkter Haftung, Wenden-Rothemühle, Germany

[21] Appl. No.: 952,754

[22] PCT Filed: Mar. 27, 1992

[86] PCT No.: PCT/EP92/00685
§ 371 Date: Nov. 30, 1992
§ 102(e) Date: Nov. 30, 1992

[87] PCT Pub. No.: WO92/17267
PCT Pub. Date: Oct. 15, 1992

[30] Foreign Application Priority Data
Mar. 28, 1991 [DE] Germany ............ 41 10 330.0

[51] Int. Cl.⁶ ................................ F28D 19/00
[52] U.S. Cl. .................... 422/173; 422/171; 422/172; 422/175; 422/199; 422/206; 165/5; 165/7
[58] Field of Search ............ 422/173, 199, 177, 175, 422/206, 171, 172; 423/239 A; 165/7, 5; 110/254; 432/181; 239/430, 429, 434.5, 568

[56] References Cited

U.S. PATENT DOCUMENTS

| | | | |
|---|---|---|---|
| 2,854,285 | 9/1958 | Barton | 239/430 |
| 3,802,489 | 4/1974 | Kirchhoff et al. | 165/7 |
| 4,114,680 | 9/1978 | Kritzler et al. | 165/7 |
| 4,235,608 | 11/1980 | Watanabe et al. | 165/7 |
| 4,446,911 | 5/1984 | Reidick et al. | 165/7 |
| 4,572,282 | 2/1986 | Ikemura et al. | 165/7 |
| 4,602,673 | 7/1986 | Michelfelder et al. | 165/7 |
| 4,678,643 | 7/1987 | Fetzer | 422/175 |
| 5,145,652 | 9/1992 | Veser et al. | 422/173 |

*Primary Examiner*—Robert J. Warden
*Assistant Examiner*—Hien Tran
*Attorney, Agent, or Firm*—Anderson Kill Olick & Oshinsky

[57] ABSTRACT

An apparatus for catalytic reduction of a nitrogen oxide in a waste gas includes a regenerative heat exchanger containing a heat-storage material consisting at least partially of a catalytic material, inlet and outlet conduits for supplying the waste gases to the heat exchanger and for delivering purified waste gases from the apparatus, respectively, first and second hoods arranged in inlet and outlet conduits respectively, on opposite sides of the heat storage material, a conduit for conducting a gaseous medium through heat exchanger, the gaseous medium flowing, in heat exchanger, through first and second hoods, and a conduit for supplying a reducing agent into the heat exchange for assisting in the catalytic reduction of the nitrogen oxide in the waste gases by the heat-storage material.

16 Claims, 3 Drawing Sheets

REGENERATIVE HEAT EXCHANGER

FIELD OF THE INVENTION

The invention relates to a regenerative heat exchanger for the treatment of waste gases, which contain toxic materials and are mixed with another medium in the heat exchanger, including a stationary or circulating storage material, which consists, at least partially, of catalytic material to which a reducing agent is added. The regenerative heat exchanger may be formed as a regenerative air heater so as a regenerative gas heater.

BACKGROUND OF THE INVENTION

In power station—and industrial heating plants, waste gases are used in a regenerative heat exchanger for preheating the combustion air. In this process, e.g., a nitrogen oxide ($NO_4$) contained in a waste gas can be further reduced, when the heat-storage material of the regenerative heat exchanger, which may be stationary or circulating, is completely or partially formed of a catalytically acting material, and, e.g., first of all ammonia ($NH_3$) is added thereto as a reducing agent. Thus, it is a case of a catalytic nitrogen oxide reduction, in which the reduction (deoxidation) of the nitrogen oxide is effected by addition of $NH_3$ in the presence of a catalyst integrated into a regenerative air heater or a regenerative heat exchanger. As a rule, the $NO_x$-containing waste gas is a crude gas of a furnace, which passes at an end of a steam generator for preheating the combustion air that flows through the regenerative heat exchanger. It is known to this end, for selective reduction of nitrogen oxides in waste gases from furnace apparatuses, to add $NH_3$ in a vapor state, in mixture with air as a carrier gas, under pressure, or in water, without pressure, to waste gases exiting a furnace apparatus. Attempts were made to obtain a strand-free ammonia-and temperature distribution in a waste gas stream before its entry into the catalyst by providing a corresponding structure inside of an extending waste gas channel. The catalyst or the heat-storage material is connected in series with a rotating regenerative heat exchanger for transmitting the heat of the waste gas to the combustion air fed to the furnace, with the optimal reaction temperatures inside the waste gas stream being taken into account. Fixed-bed catalysts especially proved themselves for a vertical descending stream of a waste gas, of which several interchangeably were used for acting on the waste gases for removing nitrogen. The fixed-bed catalysts, which were formed as a honeycomb structure, contained as a catalytically acting material vanadium compounds, which fostered the reaction of the nitrogen oxide with $NH_3$, which was previously supplied into the waste gas stream and mixed therewith in a small proportion on the way of the waste gas to the catalyst. The reaction with the nitrogen oxides, which are contained in the waste gases, results essentially in production of molecular nitrogen and water as reaction products, which can be let off harmlessly into the environment.

European patents 0 195 075 and 0 257 024 disclose that a reducing agent is added to the crude-, flue- or waste gas side, or to the pure gas-or air side, or to the gas side as well as to the air side. The $NH_3$ is thus admixed either to the flue gas before it enters the catalyst, or to the preheated fresh air before it enters the catalyst, or to the both. In any way, compounds contained in the flue gas, namely, $NO_x$, are catalitically transformed into harmless components. With flue gas side addition, the $NH_3$ and the toxic compounds $NO_x$ have a too short dwell time in the catalyst, so that only an incomplete reaction occurs. The non-consumed $NH_3$, therefore, is transported to the side with a purified flue gas which flows into the chimney, so that an undesirable slippage of non-consumed reducing agent into the environment occurs by emission through the chimney. With the air side addition of the $NH_3$, as a rule, a leakage occurs and, despite presence of seals, a certain amount of $NH_3$ is transported from the pure gas side to the purified flue gas side. This amount is therefore lost and burdens the adjacent portions of the apparatus.

SUMMARY OF THE INVENTION

The object of the invention is to avoid the foregoing drawbacks and, on one hand, with the intention of maximal reduction of $NO_3$, to achieve a high degree of reaction and, on the other hand, to provide such metering of the reducing agent that a minimal slippage of the reducing agent into the environment with the purified flue gas occurs.

According to the invention, this object is achieved by that the reducing agent input is formed, within well defined boundaries, by guide elements. By means of guide elements, which are preferably formed as guide sheets or walls, and by deep penetration to the heat-storage material, the ammonia addition, taking into account the given circle sector geometry of the regenerative heat exchanger, can be optimized with the intention of uniform impingement of the catalyst. Namely, the $NH_3$ is fed into guide sheets attached to the rotatable hood from the air side of the heat-storage material, and is purposely directed into the heat-storage material or catalyst.

The reducing agent input may consist at least of one nozzle, through which, with an air side location of the nozzle, the $NH_3$, together with a carrier gas which, as a rule, is air, is fed to the heat exchanger and is admixed to a cold combustion air stream before entering the heat-storage material. When the nozzle is formed as a slotted nozzle with a cross-section of the opening resembling a circle sector, the purposeful and directional supply of the $NH_3$ is fostered.

According to a further development of the invention, the $NH_3$ can be fed through a nozzle system consisting of separate round or fan-shaped nozzles, which permits to provide a variable feeding of the $NH_3$, especially with regard to dosage rate. When regenerative air heaters and regenerative heat exchangers are used, a finely adjusted metering of the $NH_3$ is important in order to avoid the formation of ammonia-hydrogen sulfate ($NH_4HS_4$) from $SO_3$ and $NH_3$. This requires for the $NO_4$-containing waste gas, an adequate upper surface of the catalyst, a correct temperature of the reaction, and a corresponding amount of the $NH_3$, all of which are attainable with the guide elements according to the invention, which direct the $NH_3$ to a desired location of the heat-storage material. When the guide element are so arranged in the hood that they are encircled from outside by the reducing-agent-free air as a seal gas and, advantageously, are arranged at the end of the regenerative cool-down phase, it is possible to achieve, on one hand, that with a typical for a regenerative heat exchanger chamber exchange, no $NH_3$ is transported to the purified waste gas through a sealed gap between the air and the flue gases. On the other hand, the lower temperatures at the end of the regenerative cool-down phase foster the adsorbing capacity of the catalyst with regard to the NH$_3$. The guide elements or sheets, which are arranged in the surface of the air sector, form, according to the invention, a specific mixing zone for the NH$_3$-input; it occupies about from ½ to ⅔ of the area of the air sector surface. Here, it is envisaged that a nozzle or a nozzle system is provided between the guide elements.

According to a feature of the invention, a nozzle or a nozzle system is formed in a separate, advantageously, circumferentially closed chamber and is located in a sector that lies within the air region. Thereby, the NH$_3$-carrier medium mixture is fed separately from the heat exchangeable medium. For the NH$_3$-input, the sector contains the same nozzle system as was described above for the guide elements. Because the chamber sealed from the air occupies less than 20% of the air sector cross-section, it is achieved that the NH$_3$-carrier air mixture is fed to the catalyst with a very high NH$_3$-concentration. Because the sector is arranged within the air region, it is advantageously achieved that lower temperatures can be used for adsorption, and the surrounding reducing agent-free air reduces leakage.

When a separate circumferentially closed sector is further arranged on the air output side of the heat-storage material, it is possible to separate a possible NH$_3$-excess from the heat-exchangeable medium and to deliver it again to the input, so that an adjustable metering circuit for the NH$_3$ is provided.

According to further developments of the invention, the nozzle system or nozzles can be swingingly or rotatably arranged and be so adjusted that their distance from the heat-storage material is changed. These features provide for optimal NH$_3$-delivery and its admixture to the flowing air.

It is envisaged that the guide elements are swinged together and/or are angularly adjusted separately. This enables, on one hand, to provide a favorable temperature zone and, on the other hand, to provide a variable, in accordance with the adjustable sector size, necessary dwell time for the NH$_3$-adsorption of the catalyst or the heat storage material.

For an optimal NH$_3$-delivery and-admixture, it is recommended that the sector is also swingably arranged so that a variable adjustment and position change within the air region is achieved. In a further embodiment of a separate NH$_3$-delivery, it is envisaged that seals associated with reducing agent delivery and arranged on the air input side and the air output side of the heat-storage material, are offset relative to each other. This permits to achieve that an NH$_3$-excess at the heat exchanger-or catalyst output is not carried away with combustion air, but rather is returned to the gas side before the entry to the catalyst, so that this excess takes part in the reaction once more. Alternatively, a conduit between the air output side and the gas side can be provided.

BRIEF DESCRIPTION OF THE DRAWINGS

The invention will be explained in detail below on the basis of embodiment examples illustrated in the drawings. In the drawings.

DETAILED DESCRIPTION OF THE PREFERRED EMBODIMENT

Figure 1:
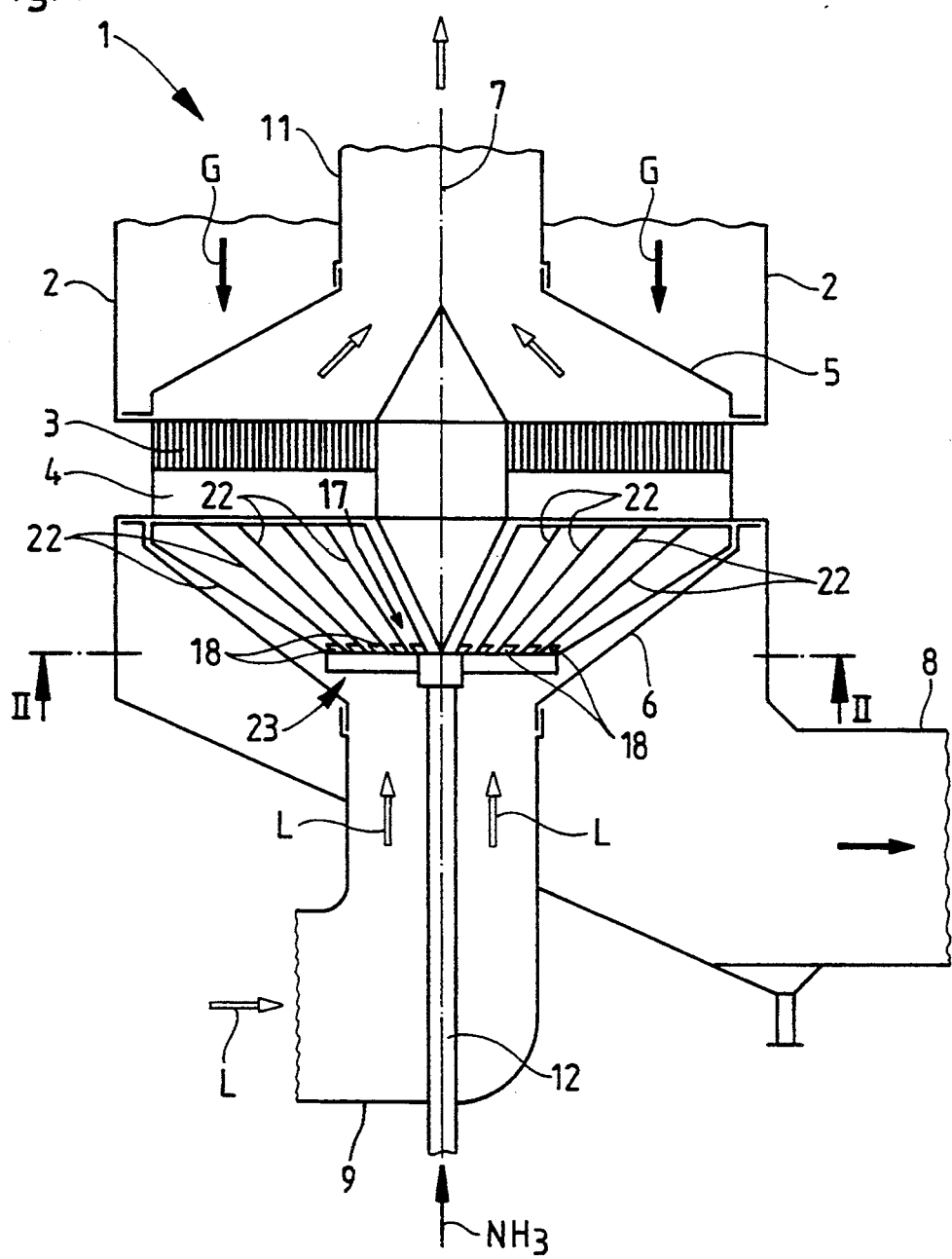
FIG. 1 shows a schematic view of a regenerative heat exchanger according to the invention with guide sheets arranged on a rotatable hood provided on the air input side of a catalyst, and with input nozzles for NH$_3$.

As shown in FIG. 1, an incoming hot waste gas, which contains NO$_4$, is supplied to a regenerative heat exchanger 1, which is formed as regenerative air heater, from a steam generator (not shown) through a channel 2. The heat crude gas G, that below will be called simply gas, streams from above into the regenerative heat exchanger that is provided, in its middle portion, with a catalyst formed of a stable heat-storage material 3, and a heat accumulator 4 located downstream of the catalyst. On opposite sides of the heat-storage material 3 and the heat accumulator 4, are respectively located segmented hoods 5,6, which jointly rotate about a vertical axis 7. The hoods 5,6 can rotate intermittently or continuously, whereby, because of the rotational movement, it is always another part of the heat-storage material 3 that is exposed to the hot gas G containing toxic materials. Upon passing of the gas G through the heat-storage material, which acts as a catalyst, a NO$_4$-reduction takes place due to absorption of NH$_3$. The treated waste gas is delivered through the outlet conduit 8. Simultaneously, the heat-storage material 3 is heated by the gas that thereby is cooled down and leaves the regenerative heat exchanger.

At the lower end of the regenerative heat exchanger, the hood 6 is connected with a conduit 9, through which clean cold combustion air, designated below as simply air, is supplied, in a direction opposite to the flow direction of the gas G, through the rotatable hood 6 to the heat-storage material 3 heatable by the gas G. The air cools down the heat-storage material 3 by absorbing heat therefrom and flows through the upper hood 5, which rotates congruently with the hood 6, as a hot air through a channel 11 to a furnace.

Figure 6:
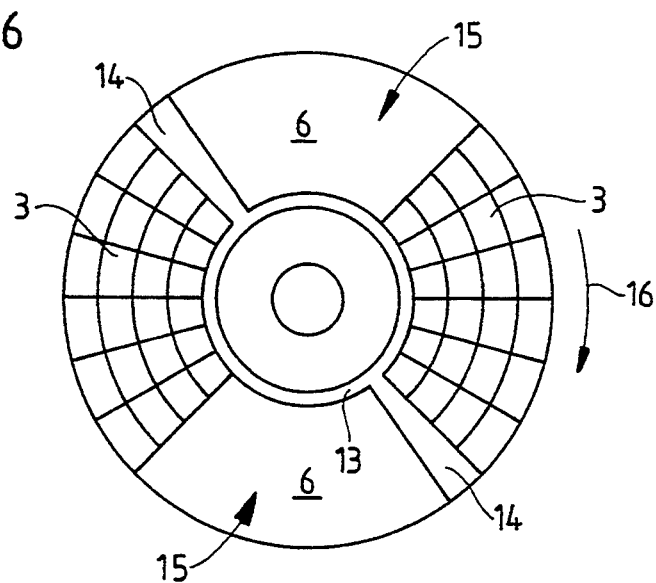
FIG. 6 shows a cross-sectional view of a regenerative heat exchanger according to the invention with separate sectors for feeding of the reducing agent, taken in the air input plane, as seen in the direction of the air flow.

In order to achieve NO$_4$-reduction, a reducing agent NH$_3$ is introduced with a preheated carrier air through a feed tube 12 into the lower hood 6 and is fed to the heat-storage material 3 therefrom. The NH$_3$ flows from an air input of the hood 6, as shown in FIG. 6, through a ring channel 13 into separate circumferentially closed sectors 14, which are formed in air regions 15 and which feed the NH$_3$ into stream cross-sections of the waste gas that remains between blades of the two rotatable hoods 5 and 6 in the heat-storage material 3 acting as a catalyst. The sectors 14 lie diametrically opposite each other and, preferably, behind the hood blades in the rotational direction 16, as can be seen here. In these locations, the heat-storage material 3 achieves the lowest temperatures and thereby fosters NH$_3$-adsorption.

To prevent overflow of NH₃ into the waste gas stream, the sectors 14 are provided with radially extending seals, e.g., labyrinth seals (not shown) which can be impinged, if necessary, with a seal gas and/or scavenging gas that is discharged from corresponding catalyst-or heat-storage material sections after NH₃-impingement of the excess NH₃ before entry into the waste gas zone in the hot air stream.

Figure 3:
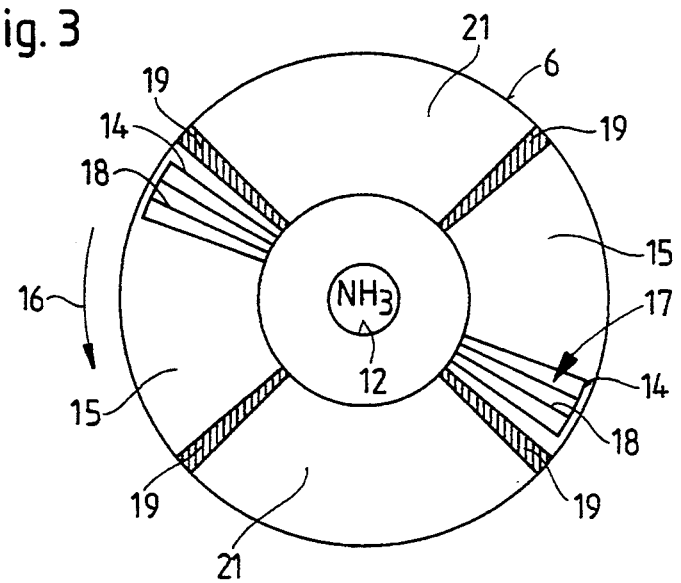
FIG. 3 shows a schematic cross-sectional view resembling that of FIG. 2 through a hood of a regenerative heat exchanger, with separate, arranged in the air region sectors for the NH$_3$-delivery by means of reducing agent input in the form of nozzles arranged in sectors.

In the embodiment of FIG. 3, the sectors 14 are provided with a reducing agent input 17 in a form of slotted nozzles 18 which permit to deliver the NH₃ directly to the desired location in the heat-storage material 3 (see FIG. 1) of the regenerative heat exchanger 1. The sectors 14, together with air regions 15 containing the slotted nozzles 18, are separated from the gas regions 21 with seals 19. The sectors 14, together with slotted nozzles 18, are swingingly arranged in the air regions 15 where they occupy about 20% of the air region cross-section.

Figure 2:
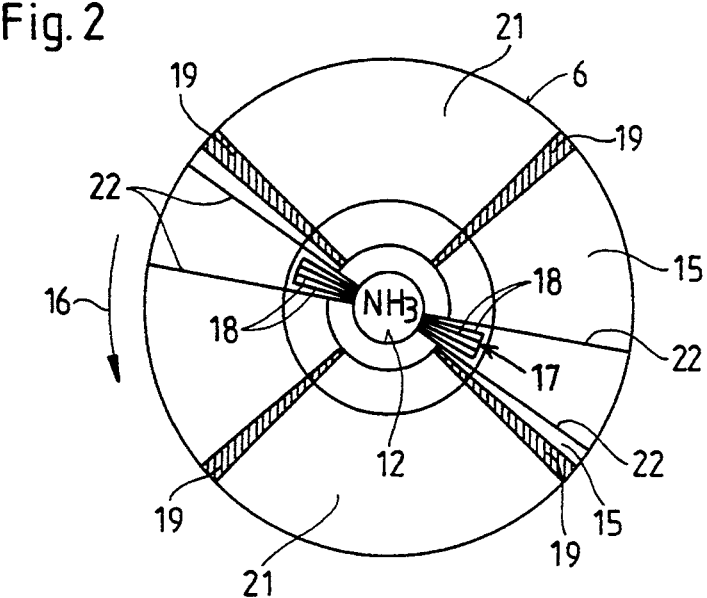
FIG. 2 shows a schematic cross-sectional view of a regenerative heat exchanger along line II—II in FIG. 1.

The embodiment of FIG. 2 differs from NH₃-delivery through sectors 14 and slotted nozzles according to FIG. 3 in that separate sectors 14, which are formed of connected with each other walls, are absent, but rather variably adjustable, that is rotatable as well as swingable and at a distance from the heat-storage material 3 adjustable, guide elements, respective sheets or walls 22, are arranged in respective air regions 15 of the lower hood 6 of the regenerative heat exchanger 1, as also shown in FIG. 1. Nozzle systems 23 are arranged between the guide sheets 22, which nozzle systems, as in the embodiment of FIG. 3, can consist of slotted nozzles 18 or several separate circular or fan-shaped nozzles (not shown).

Figure 4:
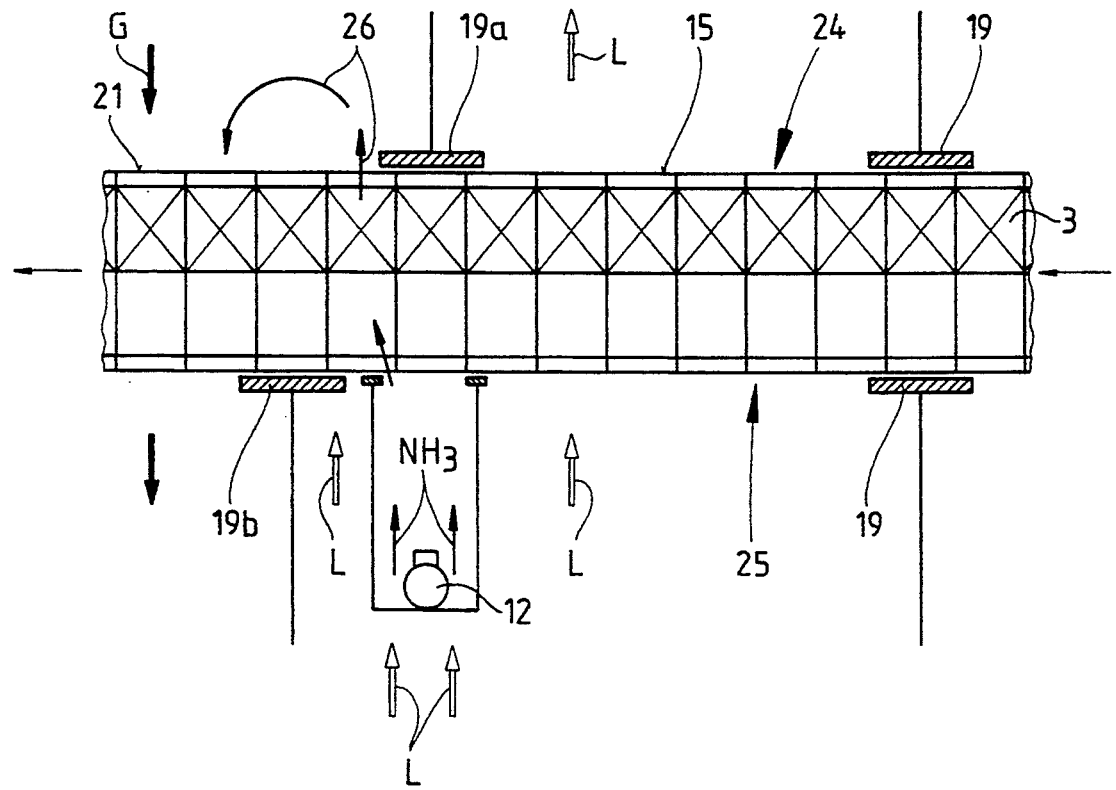
FIG. 4 shows a schematic cross-sectional view of a catalyst of a regenerative heat exchanger of FIG. 1, with offset seals.
Figure 5:
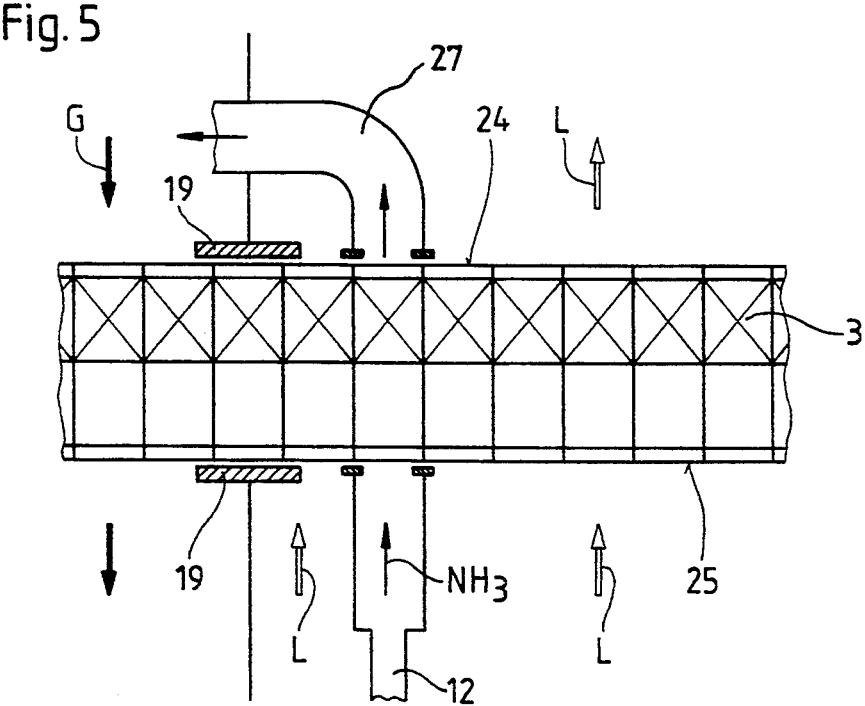
FIG. 5 shows a cross-sectional view of a catalyst of a regenerative heat exchanger of FIG. 1, with a conduit extending from the air output side to the gas side.

In order to prevent that, with a further design of the separate NH₃-input, that is through sectors or guide surfaces, excess NH₃, which remains at the output of the heat-storage material 3, is carried away with the air L, according to FIG. 4, seals 19a, which are provided on the air output side 24 and separate the air region 15 from the gas region 21, are displaced with respect to seals 19b on the air input side 25. Thereby, the NH₃-excess flows, according to arrow 26, to the gas side of the gas region 21 before entering the heat-storage material 3 and, thus, one more time takes part in the reaction. For solving the same problem, in the embodiment of FIG. 5, a conduit 27 extends from the air output side 24 to the gas region 21.

Thus, the features of the invention permit, by using a regenerative heat exchanger 1, together with a nitrogen oxide reducing agent, to keep the combustion air, before it enters the heat exchanger, free of NH₃ and to prevent the danger of penetration of excess NH₃ with air leakage into the waste gas. Adjustment of sectors or guide sheets and the nozzle system or nozzles permits to achieve an optimal charging of the heat-storage material 3. The additional devices for NH₃ are so formed that the heat-storage materials 3 or catalytic elements, which are arranged in the circular housing of the regenerative heat exchanger, are uniformly impinged according to their cross-sectional and outer surface ratios, an that heat-storage capacity of the heat-storage material is changed proportionally to the concentration of the NH₃-air mixture and in accordance with adequate dwell time. The nozzles or the nozzle system are so formed that the NH₃-input corresponds to the surface ratios defined by ring configuration. The sectors and guide sheets are so arranged that they are encompassed from all sides with NH₃-free air, so that an undesirable loss of NH₃ to the waste gas through slot leakage is prevented.

We claim:

1. An apparatus for catalytic reduction of a nitrogen oxide in waste gases, said apparatus comprising:
    a regenerative heat exchanger containing a heat-storage material portion consisting at least partially of a catalytic material;
    an inlet conduit for supplying waste gases to said heat exchanger;
    an outlet conduit for delivering purified waste gases from said heat exchanger;
    first and second hoods arranged in said inlet and outlet conduits respectively, on opposite sides of said heat storage material portion;
    means for conducting air through said heat exchanger, said conducting means being arranged so that the air flowing, in said heat exchanger, through said first and second hoods in a direction opposite to a direction of a flow of the waste gases from said inlet conduit to said outlet conduit; and
    means arranged in the second hood for supplying a reducing agent to said heat exchanger for assisting in the catalytic reduction of nitrogen oxide in the waste gases by said heat-storage material portion, said supplying means including input means having an input area and guide means for limiting said input area.

2. The apparatus of claim 1, wherein said guide means comprises guide sheets extending up to said heat-storage material portion.

3. The apparatus of claim 1, wherein said input means comprises at least one nozzle.

4. The apparatus of claim 3, wherein said at least one nozzle has an opening having a cross-section of a sector of a circle.

5. The apparatus of claim 1, wherein said input means comprises a plurality of nozzles.

6. The apparatus of claim 3, wherein said guide means comprises two guide sheets extending up to the heat storage material portion, and wherein said at least one nozzle is located between said two guide sheets.

7. The apparatus of claim 5, wherein said guide means comprises two guide sheets extending up to the heat-storage material portion, and wherein said plurality of nozzles is located between said two guide sheets.

8. The apparatus of claim 3, wherein said input means comprises at least one sector, and said at least one nozzle is arranged in said at least one sector.

9. The apparatus of claim 8, wherein said at least one sector comprises a circumferentially closed chamber.

10. The apparatus of claim 3, wherein said at least one nozzle is rotatable.

11. The apparatus of claim 5, wherein said plurality of nozzles are rotatable.

12. The apparatus of claim 8, wherein said at least one sector is pivotable.

13. The apparatus of claim 2, wherein said guide sheets are pivotable together.

14. The apparatus of claim 2, wherein said guide sheets are separately angularly adjustable.

15. The apparatus of claim 2, wherein said guide sheets are pivotable together and are separately angularly adjustable.

16. The apparatus of claim 1, wherein said conducting means has an inlet side and an outlet side, said apparatus further comprising first and second seals provided at said inlet and outlet sides respectively and offset relative to each other.

* * * * *